Figure 1:
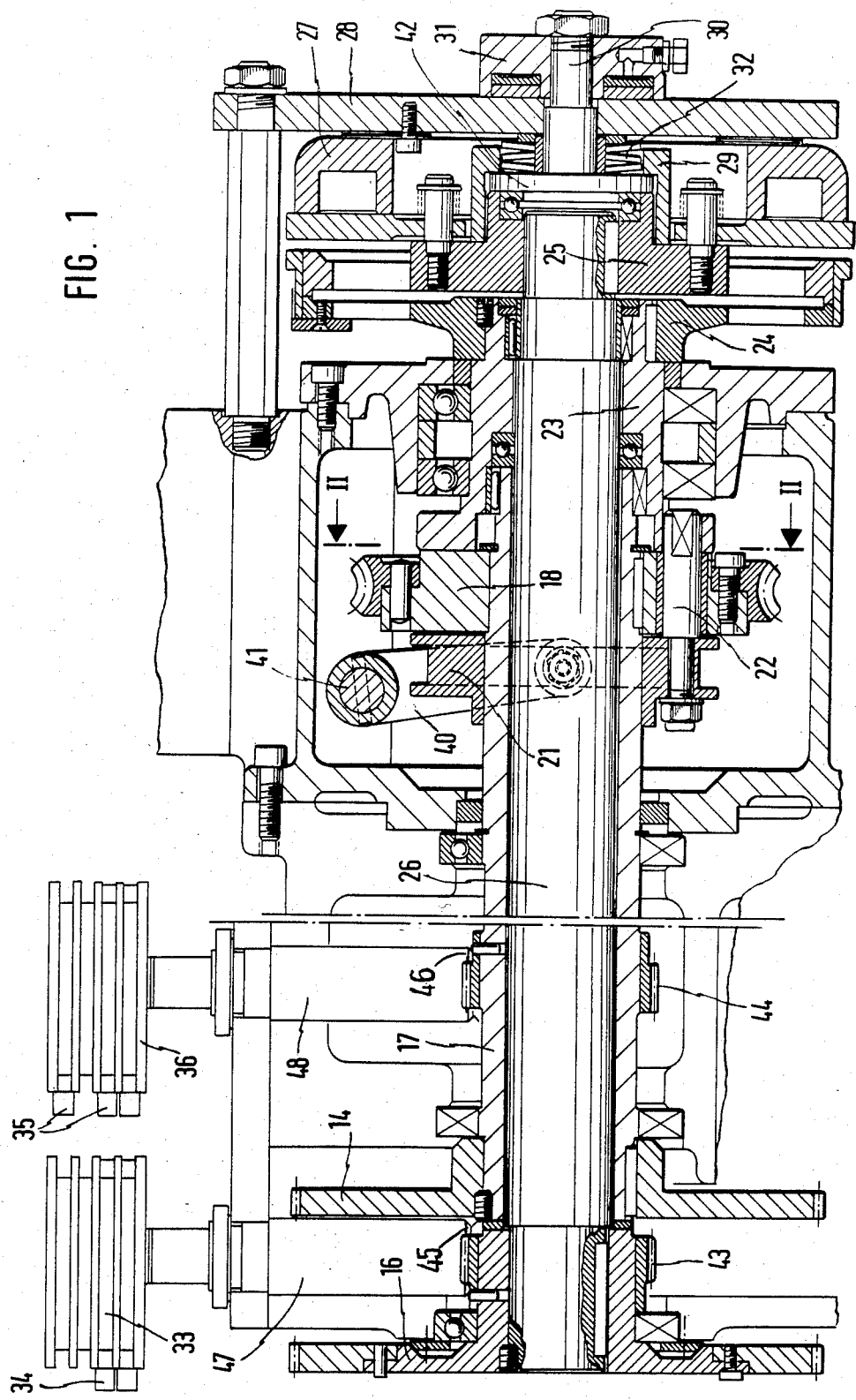

United States Patent [19]

Berbalk

[11] Patent Number: 4,607,550
[45] Date of Patent: Aug. 26, 1986

[54] TURNING MACHINE FOR MACHINING CRANKSHAFTS

[75] Inventor: Hermann Berbalk, Göppingen, Fed. Rep. of Germany

[73] Assignee: Oerlikon-Boehringer GmbH, Göppingen, Fed. Rep. of Germany

[21] Appl. No.: 537,409

[22] PCT Filed: Jan. 18, 1983

[86] PCT No.: PCT/EP83/00010
§ 371 Date: Sep. 16, 1983
§ 102(e) Date: Sep. 16, 1983

[87] PCT Pub. No.: WO83/02411
PCT Pub. Date: Jul. 21, 1983

[30] Foreign Application Priority Data

Jan. 18, 1982 [DE] Fed. Rep. of Germany ....... 3201320

[51] Int. Cl.⁴ ............................ B23C 3/06; B23C 5/18
[52] U.S. Cl. ............................................. 82/9; 409/200
[58] Field of Search ............... 82/9, 20; 409/199, 200; 51/98 SP, 105 SP, 326

[56] References Cited

U.S. PATENT DOCUMENTS

| 4,276,794 | 7/1981 | Berbalk | 82/9 |
| 4,423,991 | 1/1984 | Derr | 409/200 |

FOREIGN PATENT DOCUMENTS

| 230271 | 6/1971 | Fed. Rep. of Germany | 409/200 |
| 814570 | 3/1981 | U.S.S.R. | 82/9 |
| 921712 | 4/1982 | U.S.S.R. | 82/9 |

*Primary Examiner*—Francis S. Husar
*Assistant Examiner*—Jerry Kearns

[57] ABSTRACT

A crankshaft turning machine operating on the dual cam principle, in which the gyro cutterhead (51) is carried in an internal eccentric cam (11) and the latter in an external eccentric cam (15) rotatable in a housing, both cams being adjustable as to their mutual position. For purposes of avoiding the creation of flattened portions at the crankpins to be machined at the transition from the plunge cut to the circular feed, the design is such that the transition from the plunge cut turning process to the circular feed turning process takes place without any feed stop phase.

10 Claims, 5 Drawing Figures

TURNING MACHINE FOR MACHINING CRANKSHAFTS

The invention relates to a crankshaft turning machine operating on the dual cam, or double eccentric, principle, in which a cutterhead is carried in an internal cam and the latter is carried in an external cam rotatable in a casing, and both cams being adjustable as to their mutual position.

It is known in turning machines operating on the dual cam, or double eccentric, system, when machining the crankpins of crankshafts to perform the machining of the cheeks by a plunge cut. The plunge cut operation starts out from a concentric position of the gyro cutterhead with respect to the workpiece axis, i.e., from a position from which the gyro cutterhead can move to each crankpin to machine it.

During the plunge cut operation, the gyro cutterhead revolves in the conventional manner. Its center moves on a circular path of less than 360°. The magnitude of the rotatory movement or of the turning angle depends on the diameter of the crankpin. In this process, most of the machining of the crankshaft cheeks is comleted.

As soon as the crankpin diameter is reached, i.e., the present turning angle has been covered, the shift is made to circular feed, and then the crankpin is machined down to the specified diameter. The plunge-cutting operation is controlled by the internal cam; during the plunge cutting operation the external cam is locked up.

After the crankpin diameter is reached, the internal cam is coupled with the external cam in order to perform the circular feed in which the center of the gyro cutterhead moves around the crankpin being machined.

In order to achieve a coupling between the inside and the outside cam at the end of the plunge cutting operation, after the crankpin diameter has been arrived at, it is known to interrupt the movement of the internal cam and couple the two cams together. In this changeover, a reduction of the rotatory speed of the internal cam takes place or the internal cam is stopped, so that a position of the gyro cutterhead results in which the forces occurring become very low. Furthermore, as a result of the feed-stopped phase, more than one of the cutting edges of the gyro cutterhead pass over the cutting point. This again causes a flatting of the crankpin. Such flatting makes it necessary to provide for a larger oversize on the crankpin so as to make it possible to correct any flats in the next circular feed.

It is the object of the invention to design the machine of the kind mentioned above such as to avoid the formation of flats upon the changeover from the plunge cut to the circular feed.

This object is achieved in accordance with the invention by having the transition from the plunge cut to the circular cutting operation take place without a phase in which the feed is stopped.

Due to the fact that no feed-stopped phase takes place in the transition from the plunge cutting operation, no abrupt force variations occur. Also a plurality of the cutters of the cutterhead do not pass over a cutting point. Thus, flatting is prevented, and time is saved.

The avoidance of the feed-stopped phase can be achieved in a variety of ways. It depends on which of the two cams is driven, or on whether both cams are driven.

If, for example, the internal cam is driven, the external cam can be coupled to the internal cam after the end of the plunge cut, without the occurrence of any phase in which the internal cam is stopped. If the shafts driving the two cams are concentric, this can be accomplished by providing on the shaft driving the internal cam an axially displaceable coupling sleeve having a pin projecting parallel to the shaft axis, which can be coupled with a driver mounted on the shaft driving the external cam. The disk-like driver can have a ramp surface forming a recess and terminating in an abutment. In the coupling operation, the pin of the coupling sleeve runs on this ramp surface until it engages the abutment and drives the external cam through the driver. It is desirable that the abutment be prolonged by a bore into which the pin of the coupling bushing snaps.

In this kind of coupling, the shaft driving the external cam is driven only during the circular feeding operation, but it is held fast during the plunge cutting operation, e.g., by a braking means.

It is also possible, however, to drive the external cam during the plunge cut and not to couple the two cams together until during the circular feeding process.

It is furthermore possible to dispense with a mechanical coupling to the two cams, and instead to provide one drive, e.g., through a direct-current motor, for each cam, and to switch on the motor of the other cam each time that the changeover is made from the plunge cutting to the circular feed operation. This kind of drive has the advantage that by driving both cams simultaneously it will be possible even to machine shapes that are not round.

Figure 2:
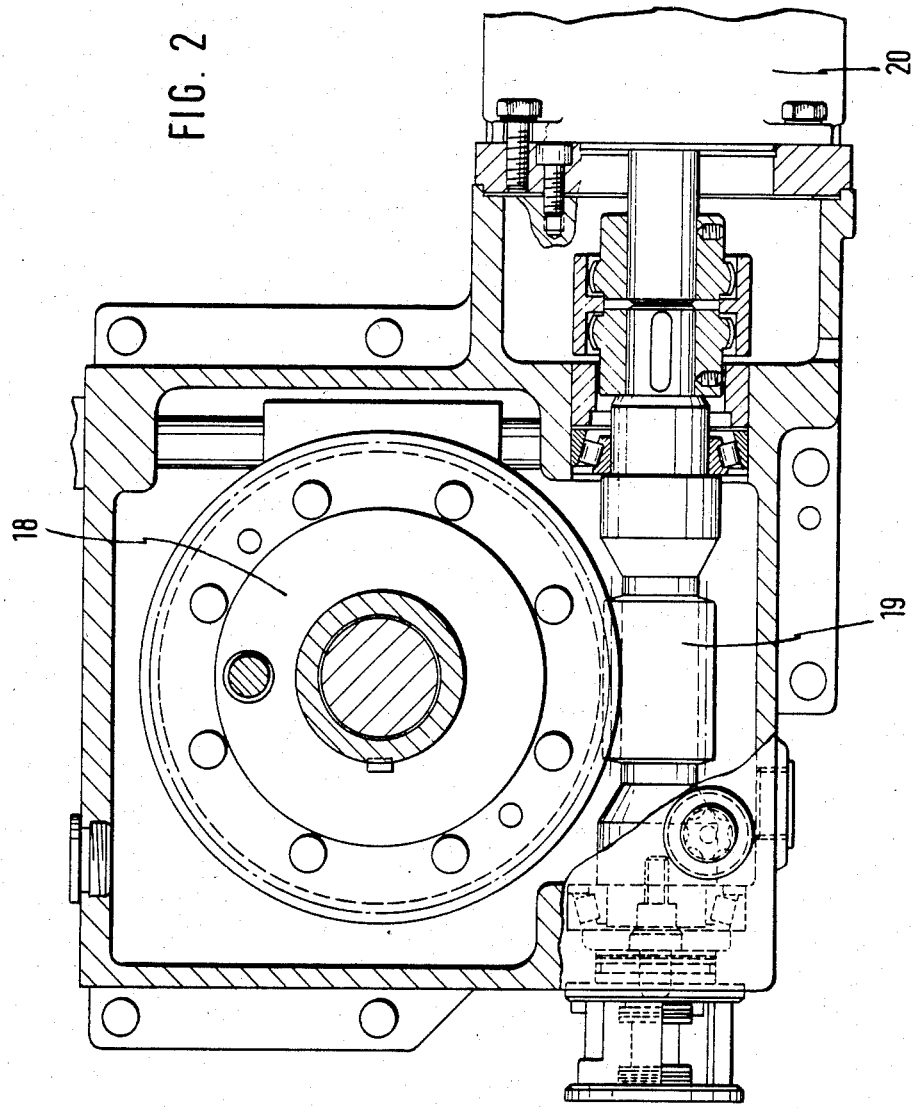
Figure 3:
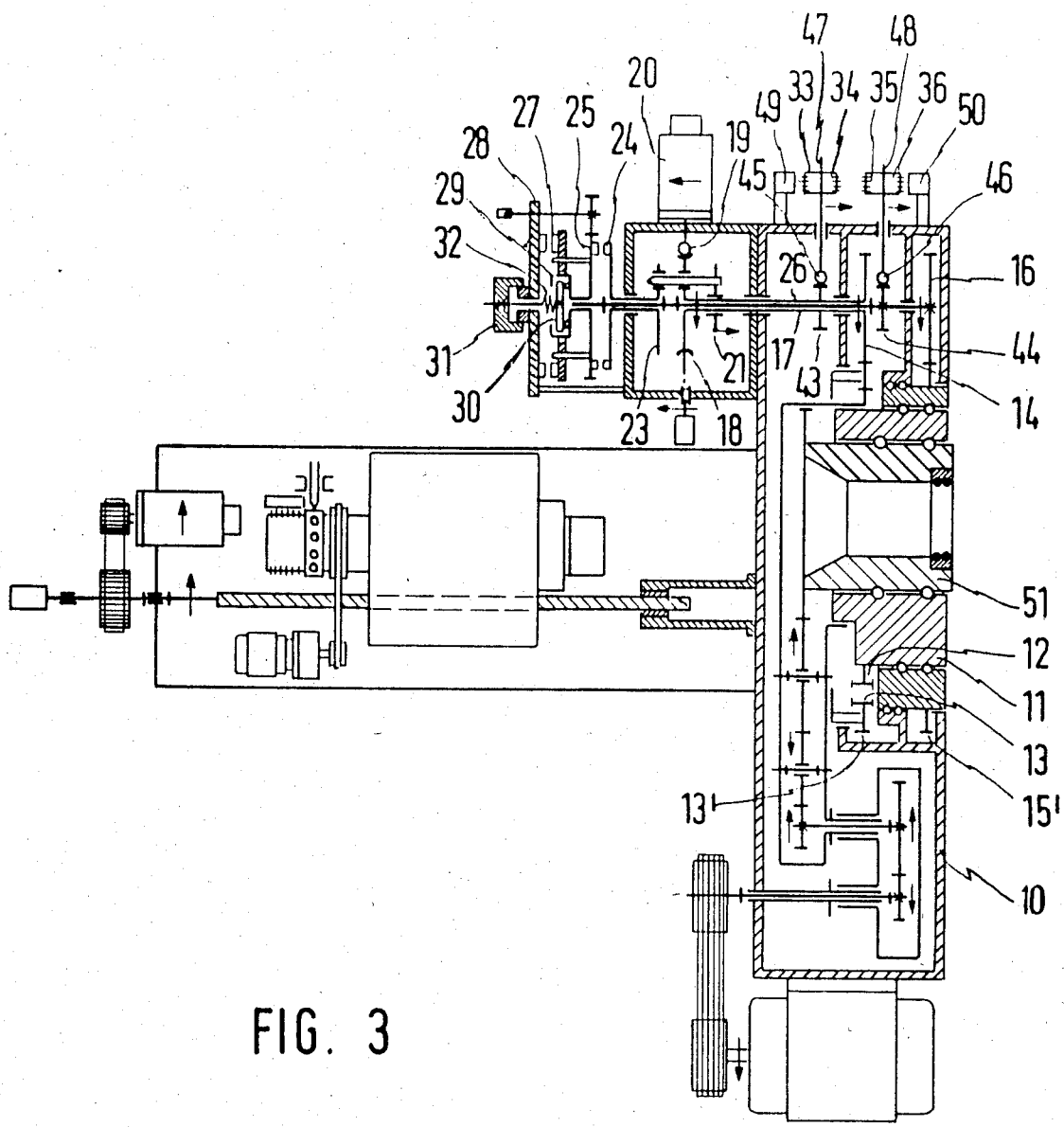
Figure 4:
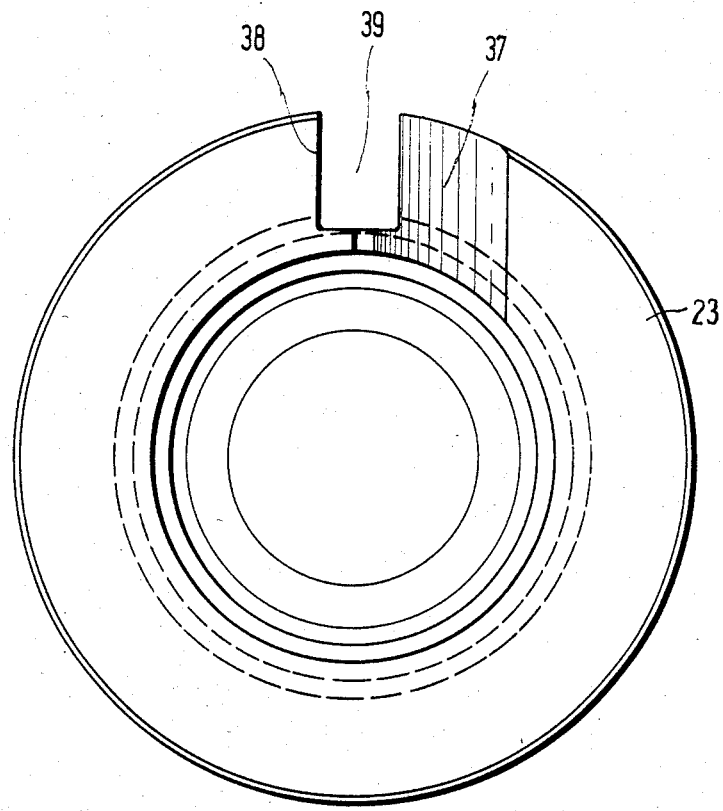
Figure 5:
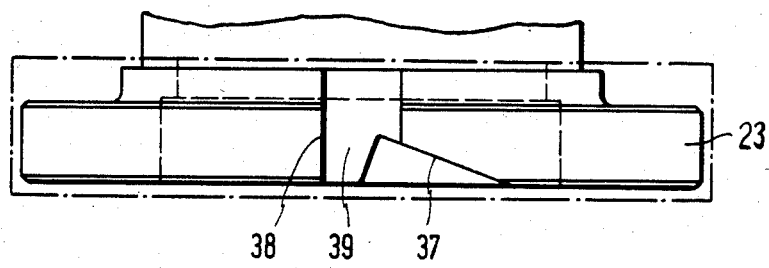

The invention will be further explained by way of example hereinbelow, in conjunction with FIGS. 1 to 5, wherein:

FIG. 1 is an axial cross section through the driving gear of the internal and external cam of a crankshaft turning machine, FIG. 2 is a cross section taken along line II—II of FIG. 1, FIG. 3 is a plan view of a crankshaft turning machine in the area of the gyro cutterhead, FIG. 4 is a plan view of the driver, and FIG. 5 is a side view of the driver.

As FIGS. 1, 3 and 4 show, the crankshaft turning machine includes a housing 10 and has an eccentric wheel 5′ which is mounted for rotation in an internal cam 11. On the internal cam 11 there is mounted a gear 12 which engages the internal teeth of a crown gear 13. The external teeth 13′ of the crown gear 13 are engaged by a gear 14. The gear 14 is mounted on a hollow shaft 17 which is driven through a worm gear 18, a worm 19 engaged with this worm gear (FIG. 2) and a direct-current motor 20. The internal cam 11 is journaled in an external cam 15 which bears a gear 15′ which is engaged with a gear 16 which is mounted on a shaft 26 that is carried in the hollow shaft 17.

A clutch sleeve 21 is disposed for axial displacement on the hollow shaft 17. The clutch sleeve 21 can pivot within a fork 40 (FIG. 1) which is connected to a shaft 41 for the axial displacement of the bushing. The sleeve 21 bears a pin 22 projecting parallel to the axial line of the shafts 17 and 26, and this pin 22, in the illustrated position, reaches through the gear 18 into a driver 23 mounted on the shaft 26. A face gear 24 mounted on the shaft 26 is connected with the driver 23 and cooperates with another face gear 25. The second face gear 25 is connected with a friction clutch 27 which has a thimble 29 which overlaps a collar 42 of a longitudinally displaceable bolt 30 on which a hydraulic cylinder 31 is formed which rests externally against a casing 28. Between the casing 28 and the collar 42 there is disposed a compression spring 32. The compression spring urges the two gears 24 and 25 into engagement when the cylinder 31 is not actuated. If, however, hydraulic fluid is fed to the cylinder 31, the bolt 30, through the collar 42 and the thimble 29, pulls the two gears 24 and 25 apart.

At the start of the machining of a crankpin, the two cams assume a position in which the tool center is situated on the axis of rotation of the crankshaft and movement in the axial direction to the crankpin that is to be machined is possible.

The relative position of the two cams determines the specified diameter of the crankpin, which is to be reached at the end of the plunge cut. The bolt 22 of the coupling sleeve 21 is drawn out of the driver 23 and the two face gears 24 and 25 are in engagement, so that the external cam is held fast. The internal cam 11 and with it the center of the excentric wheel 51 are then rotated by the motor 20 until the excentric wheel with its cutting edges has reached the desired crankpin diameter, which, as stated previously, depends on the relative starting position of the two cams. In this process the cheeks of the crankpin are partially machined.

The actual machining of the crankpin then takes place during a circular feeding process such that the internal cam 11 is fixedly coupled to the external cam 15, both cams performing a rotation of 360°. The transition from the plunge cut to the round turning must take place without any motionless phase and with great accuracy. This is accomplished as follows:

By the axial displacement of the coupling sleeve 21, the bolt 22 is pushed against the driver 23, slides along its face, and is guided over a ramp surface 37 of the driver 23 against an abutment 38. The ramp 37 is formed by a recess in the face of the driver 23. As soon as the bolt 22 comes into contact with the abutment 38, the driver 23 is set in rotation and through a shaft 26 drives the external cam 15. The axial displacement of the coupling sleeve 21 is such that the bolt 22 snaps into an opening 39 which is in the form of a prolongation of the abutment 38.

The coupling sleeve 21 is operated by cam drum 36 which is rotated by the shaft 17 through a shaft 48 and helical gears 46 and 44. The cam drum 36 has cams which cooperate with an abutment 50 also for the establishment of the starting position of the internal cam 11.

The rotatory position of the external cam 15 is detected in a similar manner through helical gears 53 and 45, a shaft 47 and a cam drum 33 with cams 34. An abutment 49 is also associated with the cam drum 33.

After a crankpin has been machined, the two cams are again separated from one another by the release of the pin 22 from the driver 23. The internal cam 11 is then returned by the motor to its starting position.

The relative position of the two cams can be varied by releasing the two face gears 24 and 25 from one another and rotating the face gear 24 and with it the internal cam 11 by turning it through the driver 23, the pin 22 and the worm drive 18 and 19 and the motor 20. In the meantime the face gear 25 is held fast by the clutch 27.

I claim:

1. A milling head drive for a crankshaft milling machine comprising:
   (A) a housing;
   (B) an external cam rotatably mounted in said housing;
   (C) an internal cam rotatably mounted in said housing and located within said external cam;
   (D) an eccentric wheel carried in said internal cam for milling a crankshaft;
   (E) motor means mounted on said housing;
   (F) coupling means connected to said motor means for coupling said motor means to said cams, said coupling means including
      (1) an external shaft rotatably mounted in said housing and connected to said internal cam,
      (2) a coupling gear fixedly mounted on said external shaft and connected to said motor means for rotating said external shaft,
      (3) a clutch sleeve mounted on said external shaft to be movable axially of said external shaft and having a bolt fixed thereto and extending through said coupling gear for transmitting rotation of said motor means,
      (4) moving means mounted on said housing for moving said clutch sleeve axially of said external shaft,
      (5) an internal shaft rotatably mounted in said housing and connected to said external cam,
      (6) a driver means mounted on said internal shaft and having a face surface facing said bolt to be contacted by said bolt when said clutch sleeve is moved axially of said external shaft toward said driver means, said face surface having an opening defined therein at a preselected location and a ramp means associated with said opening for connecting said face surface with said opening, said driver means including an abutment wall defining one wall of said opening, and
      (7) said moving means moving said bolt into contact with said face surface to engage said abutment wall when said preselected location is adjacent to said bolt for coupling said internal and external cams together via said external shaft, said clutch sleeve, said bolt, said driver means abutment wall and said internal shaft and coupling said cams to said motor means via said coupling gear and said bolt.

2. A drive according to claim 1, wherein said opening is an opening extending parallel to the axial direction of said bolt.

3. A drive according to claim 1, further comprising a gear wheel meshing with said driver means and mounted on said internal shaft.

4. A drive according to claim 3, further including a braking clutch cooperating with said gear wheel.

5. A drive according to claim 4, wherein said friction clutch has a thimble, and further including a longitudinally movable element having a collar thereon; said friction clutch gripping said element via said thimble and said collar, a hydraulic cylinder for actuating said element, and a compression spring engaging said collar, upon actuation of said hydraulic cylinder said element releasing said gear wheel from engagement with said driver means against the action of said compression spring.

6. A drive according to claim 4, further including means for guiding said internal shaft in said external shaft.

7. A drive according to claim 1, comprising a gear wheel drivingly connected with said internal cam, a crown gear with internal teeth meshing with said gear wheel and with external teeth meshing with a gear wheel mounted on a hollow shaft.

8. A drive according to claim 7, wherein said moving means includes a fork for axially adjusting said clutch sleeve on said external shaft, and and operating shaft for operating said fork.

9. A drive according to claim 7, wherein said coupling means includes a worm wheel mounted on said external shaft, and a worm engaging said worm wheel.

10. A drive according to claim 7, further comprising function generators for indicating the rotational position of said internal and external cams.

* * * * *